(12) United States Patent
Apostolos et al.

(10) Patent No.: US 8,912,943 B2
(45) Date of Patent: Dec. 16, 2014

(54) NEAR FIELD SUBWAVELENGTH FOCUSING SYNTHETIC APERTURE RADAR WITH CHEMICAL DETECTION MODE

(71) Applicant: AMI Research & Development, LLC, Windham, NH (US)

(72) Inventors: John T. Apostolos, Lyndeborough, NH (US); Judy Feng, Nashua, NH (US); William Mouyos, Windham, NH (US)

(73) Assignee: AMI Research & Development, LLC, Windham, NH (US)

( * ) Notice: Subject to any disclaimer, the term of this patent is extended or adjusted under 35 U.S.C. 154(b) by 78 days.

(21) Appl. No.: 13/705,343

(22) Filed: Dec. 5, 2012

(65) Prior Publication Data

US 2014/0152486 A1   Jun. 5, 2014

Related U.S. Application Data

(60) Provisional application No. 61/630,149, filed on Dec. 5, 2011, provisional application No. 61/582,868, filed on Jan. 4, 2012.

(51) Int. Cl.
| | | |
|---|---|---|
| *G01S 13/88* | (2006.01) | |
| *G01S 13/89* | (2006.01) | |
| *G01V 3/12* | (2006.01) | |

(52) U.S. Cl.
CPC ............ *G01S 13/885* (2013.01); *G01S 13/887* (2013.01)
USPC ............................. 342/22; 342/25 R; 342/52

(58) Field of Classification Search
CPC ... G01S 13/887; G01S 13/89; G01S 13/0209; G01S 13/885; G01S 7/411; G01N 22/00; G01N 24/08; G01N 33/0057; G01V 3/12; G01V 3/32

USPC ............................. 342/22, 27, 25 R, 25 A, 52
See application file for complete search history.

(56) References Cited

U.S. PATENT DOCUMENTS

| 6,344,818 B1 * | 2/2002 | Markov ......................... 342/22 |
| 7,262,602 B2 * | 8/2007 | Meyer ........................... 324/337 |

(Continued)

FOREIGN PATENT DOCUMENTS

| EP | 520666 A1 * | 12/1992 |
| IN | 2081/DEL/2009 | 4/2013 |

(Continued)

OTHER PUBLICATIONS

Intaraprasonk et al., "Combining radiationless interference with evanescent field amplification," received Jan. 15, 2010; revised Mar. 27, 2010; accepted Apr. 8, 2010; posted Apr. 16, 2010 (Doc. ID 122743); published May 7, 2010, Optical Society of America, *Optics Letters*, May 15, 2010, vol. 35, No. 10, 1659-1661.

(Continued)

*Primary Examiner* — John B Sotomayor
(74) *Attorney, Agent, or Firm* — Cesari and McKenna, LLP

(57) ABSTRACT

Detection of objects such as a buried explosive device while operating from a moving platform using a radio frequency emission system having two modes. An electromagnetic wave emission and detection system operates in a first mode to locate objects of interest and in a second mode to determine if an object contains explosive materials. In the first mode, the emission and detection system preferably operates as a subwavelength focusing, wideband, superlens using a near field super gain synthetic aperture continuous wave (CW) swept radar. In the second mode the system preferably enabled after detection of an object in the first mode, uses chemical detection methods such as Nuclear Quadrupole Resonance (NQR).

8 Claims, 7 Drawing Sheets

(56) References Cited

U.S. PATENT DOCUMENTS

| | | | |
|---|---|---|---|
| 7,271,720 B2 * | 9/2007 | Tabe | 340/540 |
| 7,423,587 B2 * | 9/2008 | Mueller | 342/378 |
| 7,800,495 B1 * | 9/2010 | Parrish | 340/540 |
| 7,889,113 B2 * | 2/2011 | Cardiasmenos et al. | 342/22 |
| 8,618,976 B2 | 12/2013 | Paglieroni et al. | |
| 2008/0211711 A1 * | 9/2008 | Mostov et al. | 342/179 |
| 2010/0090887 A1 * | 4/2010 | Cooper et al. | 342/25 F |
| 2010/0141502 A1 * | 6/2010 | Cardiasmenos et al. | 342/22 |
| 2011/0018535 A1 * | 1/2011 | Rudakov | 324/303 |
| 2011/0128179 A1 | 6/2011 | Apostolos et al. | |
| 2012/0008139 A1 * | 1/2012 | Miziolek et al. | 356/318 |
| 2012/0229322 A1 * | 9/2012 | Mostov | 342/22 |
| 2012/0245873 A1 * | 9/2012 | Donnangelo et al. | 702/65 |

FOREIGN PATENT DOCUMENTS

| | | | |
|---|---|---|---|
| IN | 200902081 I1 * | 4/2013 | |
| KR | 2013109501 A * | 10/2013 | |
| KR | 2013109511 A * | 10/2013 | |
| KR | 2013109526 A * | 10/2013 | |
| KR | 10-1362231 | 2/2014 | |
| KR | 10-1387440 | 4/2014 | |
| KR | 10-1387441 | 4/2014 | |
| WO | WO 2007/136747 A2 | 11/2007 | |
| WO | WO 2012161645 A1 * | 11/2012 | |

OTHER PUBLICATIONS

Merlin, R., "Radiationless Electromagnetic Interference: Evanescent-Filed Lenses and Perfect Focusing," *Sciene Magazine*, vol. 317, Aug. 17, 2007, pp. 927-929, Apr. 16, 2007; accepted Jun. 27, 2007, published online Jul. 12, 2007; 10.1126/science.1143884, www.sciencemag.org.

"Synthetic aperture radar" from Wikipedia, the free encyclopedia, retrieved from http://en.wikipedia.org/w/index.php?title=synthetic_aperture_radar&oldid=574822402, last modified on Sep. 28, 2013 at 3:01, 19 pages.

Balanis, Constantine A., *Antenna Theory Analysis and Design*, John Wiley & Sons, Inc. New York, 1982, pp. 306-309.

Collin and Zucker, *Antenna Theory part 1*, Inter-University Electronics Series, vol. 7, McGraw-Hill Book Company, New York, 1969, pp. 244-257.

Ulaby et al., *Microwave Remote Sensing Active and Passive*, vol. II *Radar Remote Sensing and Surface Scattering and Emission Theory*, Remote Sensing a Series of Advanced Level Textbooks and Reference Works, Artech House, Inc., Norwood, MA, 1982, pp. 630-745. (uploaded in two parts).

\* cited by examiner

NEAR FIELD SUBWAVELENGTH FOCUSING SYNTHETIC APERTURE RADAR WITH CHEMICAL DETECTION MODE

CROSS REFERENCE TO RELATED APPLICATIONS

This patent application claims priority to U.S. Provisional Patent Application Ser. No. 61/630,149 filed Dec. 5, 2011 entitled "Neuromorphic Wideband Near Field Subwavelength Focusing Synthetic Aperture Frequency Scanning CW Radar Parallel Processor" and also claims priority to U.S. Provisional Patent Application Ser. No. 61/582,868 filed Jan. 4, 2012 entitled "Creation of Subwavelength Focusing Wideband Super Lens Using a Near Field Super Gain Synthetic Aperture Radar". The content of both of these referenced patent applications is hereby incorporated by reference in their entirety.

BACKGROUND

1. Technical Field

This patent application relates to detection of objects such as a buried explosive device while operating from a moving platform.

2. Background Information

An electromagnetic device known as a super lens is capable of manipulating the near field of an antenna and focusing electromagnetic waves to resolutions beyond the diffraction limit. Numerous super lenses have been fabricated to operating from radio frequency (RF) wavelengths up to optical wavelengths. One approach described by Merlin, R., in "Radiationless Electromagnetic Interference: Evanescent-Field Lenses and Perfect Focusing", *Science*, Volume 317, Issue 5840, pp. 927-(2007) uses grating like surfaces and arrays rather than volumetric structures. Subwavelength structures can control the near field, and are capable of focusing well beyond the diffraction limit, operating at arbitrary frequencies, forcing convergence to a spot on the focal plane.

It is also known that a synthetic aperture radar (SAR) is a form of radar system that uses relative motion between an antenna and its target region to provide distinctive long-term coherent-signal variations that are exploited to obtain finer spatial resolution than is possible with conventional beam-scanning means. See for example, the book by Fawwaz. T. Ulaby, *Microwave Remote Sensing: Active and Passive*, Volume II (Norwood, Mass.: Artech House, Inc., 1986). It is also known that the spatial resolution of a densely packed antenna array can be much smaller than the diffraction limit. Such "super gain" antennas are described in C. A. Balanis, *Antenna Theory* (3rd Edition) (Hoboken, N.J.: John Wiley & Sons, 2005) and/or R. E. Collin and F. J. Zucker (eds.), Antenna Theory, Part I (New York: McGraw-Hill, 1969). The entire teachings of these publications are hereby incorporated by reference.

SUMMARY

A system and method are described that can both (a) detect the presence of a buried metal object and (b) determine if explosive chemicals are present in the object.

In one embodiment, direct detection of Buried Explosive Hazards (BEHs) from a moving vehicle is possible. The system uses the methodologies of synthetic aperture radars combined with super lens type elements. The system operates in a first mode to provide a forward looking, synthetic aperture ground penetrating radar using near field subwavelength focusing to perform initial detection of a buried object. Once an object is detected, the system operates in a second chemical detection mode such as by using Nuclear Quadrupole Resonance (NQR) techniques to excite continuous Rabi transitions in the buried object.

More particularly, in the first operating mode, the system looks for resonances associated with a buried object using a signal/signal reference sequence as the vehicle moves along. To eliminate the clutter associated with proximate objects and thus increase the range at which detection occurs, a synthetic aperture array is created as the vehicle moves forward. The synthetic aperture radar may operate in a continuous wave (CW) emission mode across a wide band (e.g. 300 kHz to 300 MHz) facilitated by a high Q tuner. An advanced processor may optionally create feature based representations of detected objects of interest.

For example, if the system is mounted on a vehicle moving at 30 mph and a complete wide band frequency scan takes 10 milliseconds, then a virtual antenna is created every half foot. A sliding array of length 10 feet will then generate 20 virtual antennas. The end result is a spot size of 5 feet at a range of 50 feet at a transmitting frequency of 1 MHz. At 5 MHz in a super lens mode, the spot size can be as little as 1 foot. The preferred antenna is a high Q tunable configuration such that required incident power density at the ranges of interest is maintained. The processing needed to form the high resolution receive beams will result in low efficiency receive beams, which is tolerable as long as the system remains external noise limited.

After an object is detected in this first operating mode, a second operating mode is enabled where the radiating antenna structure can be used to detect whether explosive substance(s) comprise some part of the buried object. In this mode a radio frequency (RF) transmitter is operated to create a time varying electromagnetic field enclosing the object of interest. In one embodiment the time varying electromagnetic field is in a frequency range known to excite nuclear quadrupole resonance (NQR) transitions in commonly used explosive materials. The applied field will generate electric quadrupole moment transitions in any such material within range and cause that material to emit coherent RF emissions. These coherent RF emissions are detected and then further processed to determine characteristics of the substance, such as by detecting their amplitude, phase and/or frequency.

The NQR response for a given material is characterized as behaving according to the Rabi formulation that predicts a likelihood that the stimulated emission is either in the ground state or the excited state. Thus, if the resonant frequency for a particular material of interest is known, the power incident on the material is known, and the excitation signal is known (such as a chirp), the NQR response and therefore the presence certain types of materials known to respond can thus be detected.

The system uses advanced electromagnetic techniques to detect Buried Explosive Hazards (BEH) across a wide range of environmental conditions, in various terrains, at depths from flush buried down to a meter or more, and in mounted and dismounted configurations. It provides a significance advance towards a goal of fielding a system that can provide a standoff detection capability. This capability is critical to saving lives and improving the safety for both a soldier and civilians.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
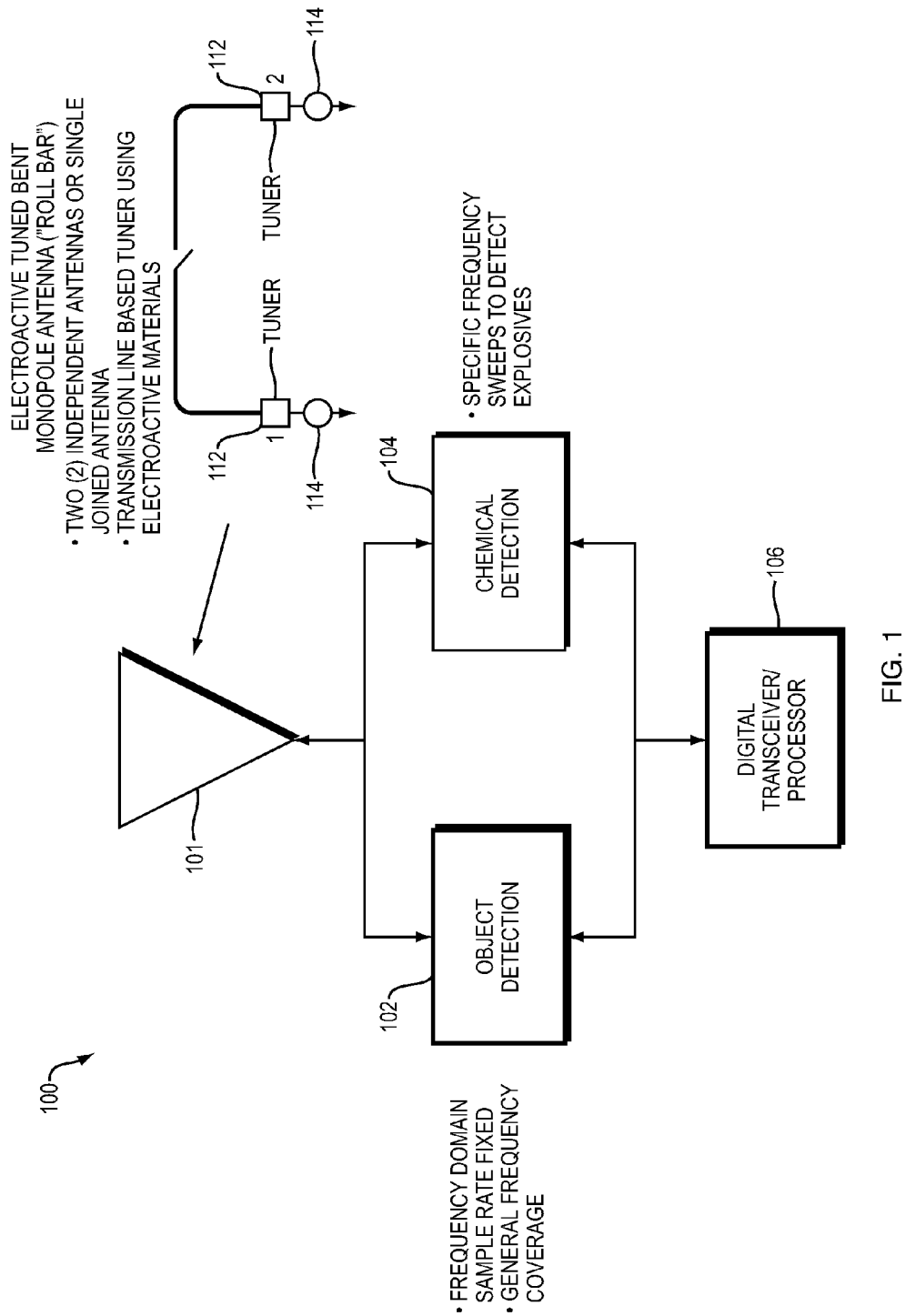
FIG. 1 shows a system architecture.

FIG. 1 is a high level notional diagram of a system 100 architecture for buried object and chemical composition detection. The system 100 consists of electromagnetic radiator 101, an object detection portion 102, a chemical detection portion 104, and a digital transceiver/processor portion 106. The system 100 detects buried objects or voids in the ground from a moving platform using a wideband, frequency scanning, near field focusing, synthetic aperture, continuous wave radar. Once an object is detected its chemical composition is determined by utilizing one or more of the same portions of the electromagnetic radiator 101, such as using Nuclear Quadrupole Resonance (NQR) excitation techniques.

The radiator 101 can take the form of a bent monopole antenna 110. It can for is example take the shape of a roll bar attached to a moving vehicle. The monopole antenna can operate as either two independent antennas or as a single joined antenna. The antenna elements can be tuned using adjustable transmission lines with electroactive materials. As shown in FIG. 1, this may result in for example a preferred embodiment where two elements are controlled by two separate tuners 112 and associated electronic transceiver components 114.

Figure 2:
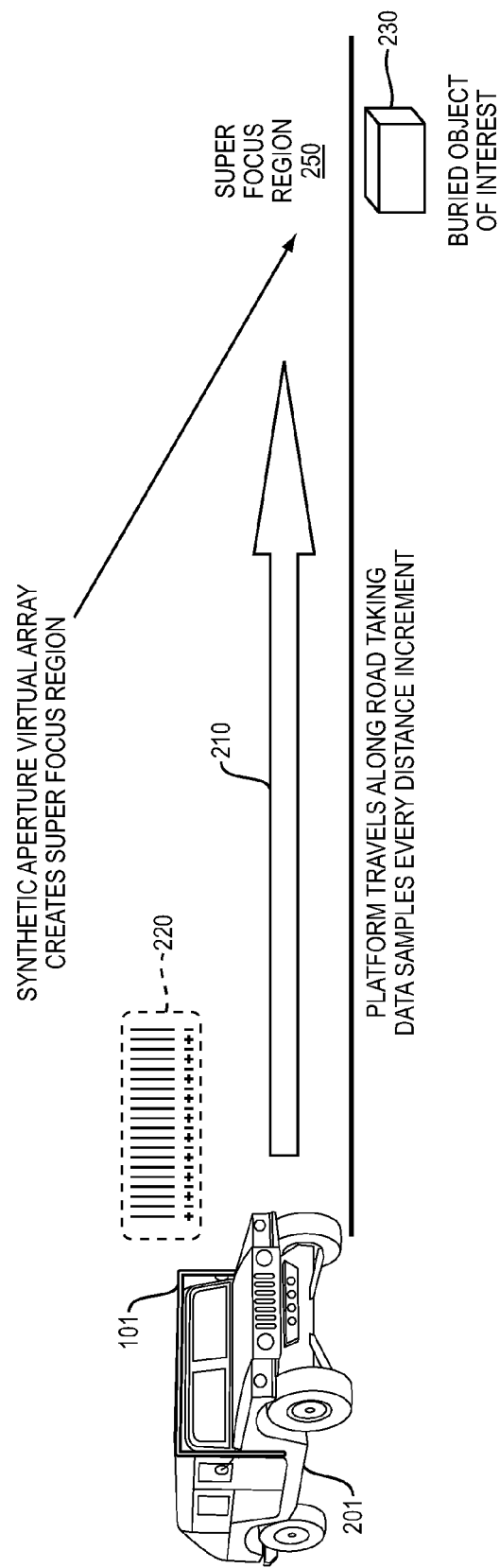
FIG. 2 illustrates a moving platform, a buried object of interest, and the system providing a synthetic aperture antenna array for object detection in a first operating mode.

As shown particularly in FIG. 2 the system 100 is mounted on a moving platform such as a vehicle 201. The antenna(es) 101 can be implemented as a roll bar shown in the front portion of the vehicle.

In a first mode, the vehicle 201 moves along a direction of travel 210 emitting a wideband swept CW radar signal and taking samples of the response at specific distance increments. By taking data continuously over a wide frequency band using the electroactive tuned antenna, a synthetic aperture radar using the set of virtual antenna elements 220 is thus formed. This near field sub wavelength probing can be used to detect buried objects 230 or voids in the ground. The system thus provides the capabilities of a Ground Penetrating Radar (GPR) with lower power and stand-off capabilities.

One unique aspect of the synthetic aperture virtual array 220 approach here uses a tunable hi-Q antenna configuration to ensures controlled incident power density at the ranges of interest (e.g., between the vehicle and a buried object at a range of about 50 feet away). As the platform vehicle 210 moves forward, the preferred approach here creates a synthetic aperture focusing super lens spot 250 that reduces clutter associated with proximate objects, and increase the range at which detection occurs.

The split roll bar antenna 101 enables an additional degree of freedom to precisely locate objects of interest using direction finding techniques such as radar monopulse algorithms. A parallel chemical detection path for the antenna 101 can involve Raman scattering techniques, terahertz molecular resonances, infrared radar ground surface inspection or low frequency resonances such as NQR in the preferred embodiment. The chemical path is used as a second stage process after the initial synthetic aperture radar alarm.

Figure 3:
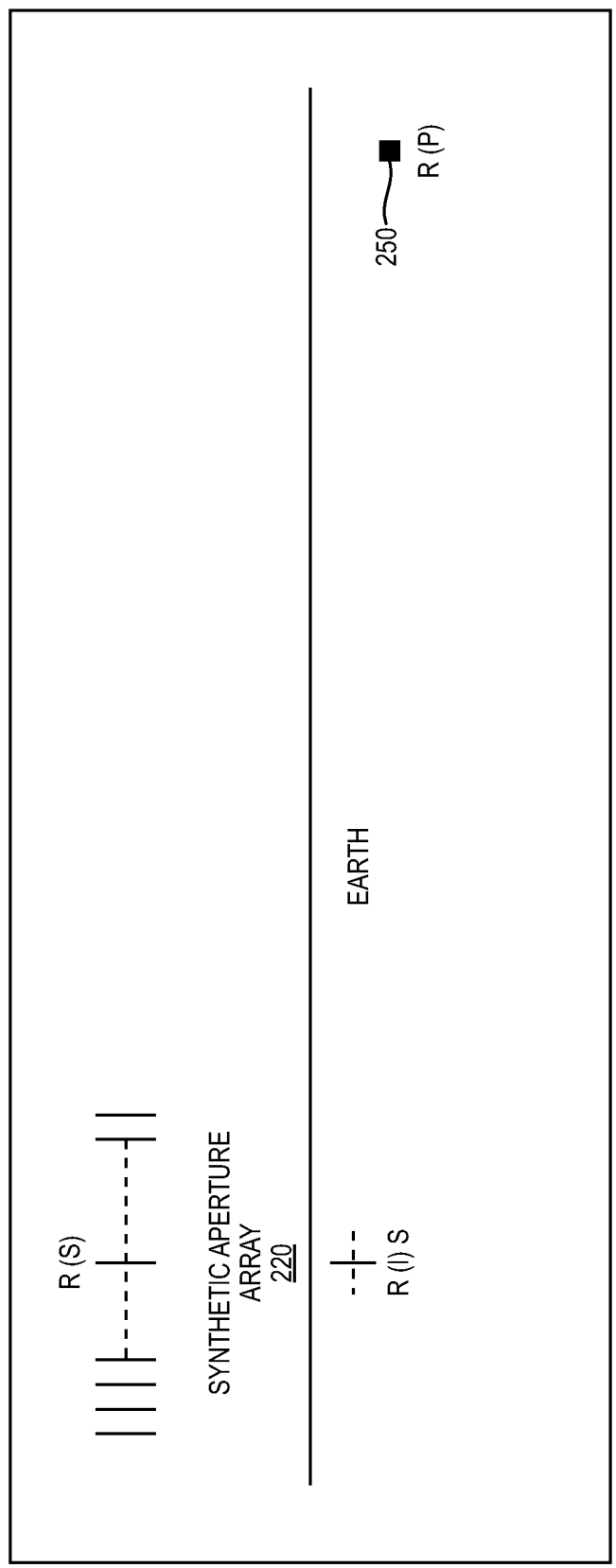
FIG. 3 is a graphical representation of the system in the synthetic aperture virtual array mode.

Operation of this in the super lens sub wavelength focusing mode can be estimated by referring to the model shown in FIG. 3. In FIG. 3, R (p) is the location of the desired sub wavelength focusing spot 250. An element s located at R (s) is an element in the synthetic aperture array 220 created as the vehicle 201 progresses along the direction of travel 210, while RI (s) is the location of an image element due the presence of the earth. The field at an arbitrary point R is calculated by summing over 2 m real and image elements and Q wavelengths (frequencies). The field function is shown below.

$$E(R) = \sum_{N=1}^{Q} \sum_{S=1}^{M} A(S, N) \left( \frac{e^{i(2\pi/\lambda_N)|R(s)-R|}}{|R(s) - R|} + \frac{e^{i(2\pi/\lambda_N)|RI(s)-R|}}{|RI(s) - R|} F(\lambda_N) \right) \quad (1)$$

In the above expression for the field, E (R), F ($\lambda$) is the earth interaction factor and A (S, N) are the coefficients needed to create the sub wavelength spot 250. The A (S, N) are calculated by performing a least squares fit to a 3-D Gaussian spot 250 at R (p). The A (S, N)'s for supergain applications are usually highly oscillatory large values changing polarity as a function of s. The limit on how small a spot size is possible rests on controlling the A(S, N) amplitudes. The coefficients can be controlled by the method of Lagrange multipliers when solving for the coefficients. In practice, the high resolution capability of the near field super lens electromagnetic probe is used as a means of feature extraction of targets of interest.

Figure 4:
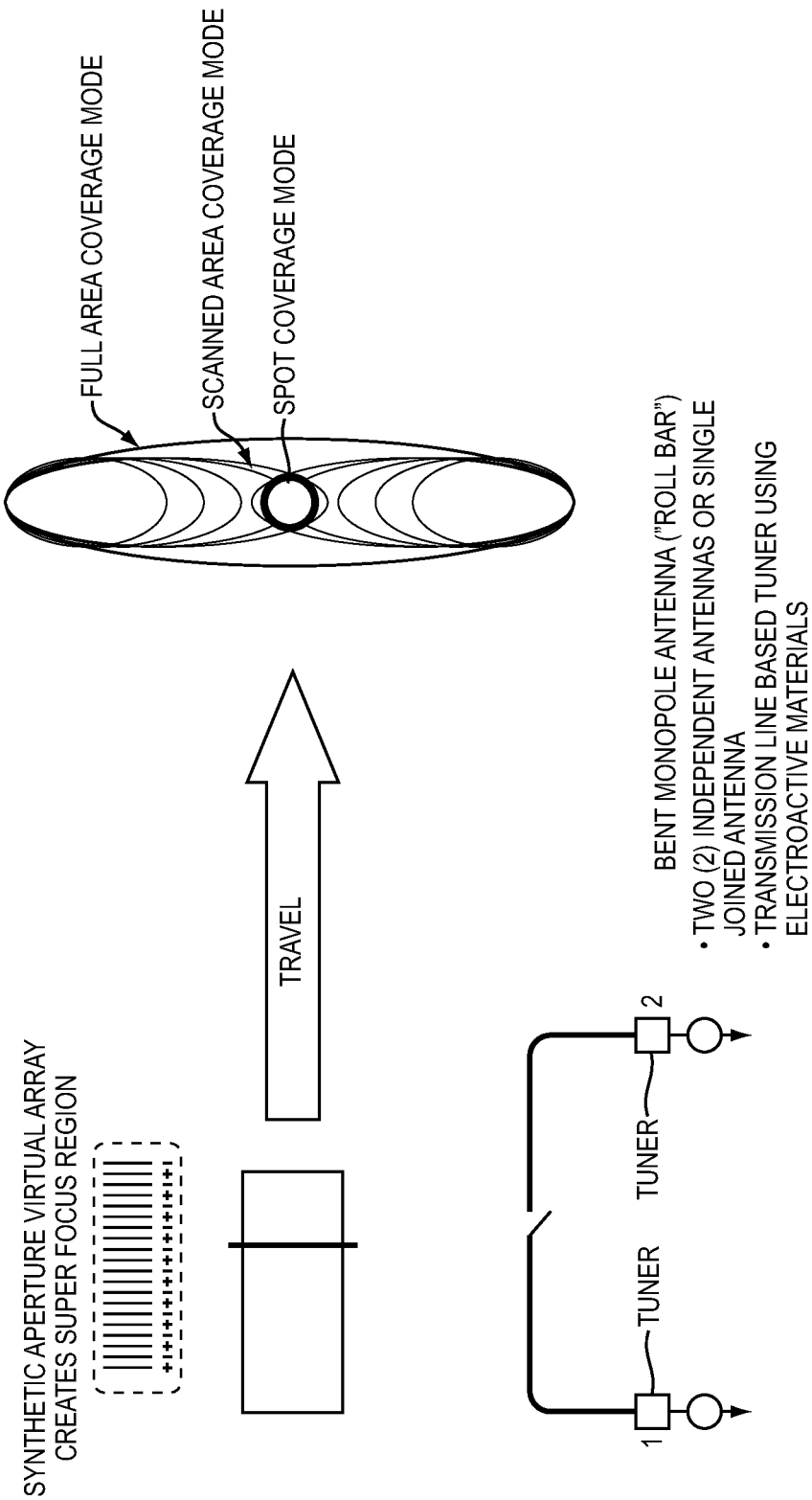
FIG. 4 is further referenced to describe operation of the system.

Referring to FIG. 4, full coverage area and resulting spot 250 size provided by the synthetic aperture virtual array 220 can therefore be adjusted by changing its operating characteristics. Thus a full area coverage mode may be initially enabled consisting of the overlapping scanned areas created from each successive sweep. Once an object of interest is detected, a spot coverage mode the may be enabled. In one example system a virtual array is created with elements spaced at approximately every half foot. This can be achieved if, for example, the platform is moving at a known speed such as 30 miles an hour. If the complete wideband frequency scan can complete in 10 ms, a sliding array of 10 feet in length generates 20 virtual antennas along the path of travel at a range of 50 feet, providing a spot diameter of 5 feet within a 1 MHz super focus region located at R(p) 250.

The resulting responses can be further processed to create feature based representations of the objects. In one example implementation, the processor 106 can for example perform a frequency domain transform on the 2-D images formed by the synthetic aperture radar as the vehicle 201 progresses along path 210. Features such as resonances associated with object size and shape can be extracted and correlated against a library of object classes followed by hierarchical Bayesian classifiers. This further processing can provide sub wavelength probing capability at standoff ranges of up to 50 feet for both metallic and non-metallic objects while providing estimations of depth, size and class of object, including its shape, size, and other attributes. Techniques for classifying images of objects are well known in the art, such as for example from U.S. patent application Ser. No. 13/536,494 filed on Jun. 28, 2012 entitled "Neuromorphic Parallel Processor" the entire contents of which are hereby incorporated by reference. Many other object classification techniques can be used with the present system, however.

Thus as the synthetic aperture virtual array 220 moves along a direction of travel, the bent monopole antenna emits swept CW radar signals to provides full area coverage mode consisting of a set of spot area coverage modes. A well defined spot coverage area can provided in a very small incremental space, such as on the order of 1 foot. The detection can operate over to a meter depth into the ground and can detect over surface inclines.

This first mode is considered a coarse or queuing detection mode where the near field sub wavelength probing is used to detect the presence of a buried object. Once an object enters a near field, the system 100 then enters a second mode or fine detection mode.

In this fine detection mode the chemical detection sensor 104 is enabled for the chemical path. In this mode the transceiver electronics 106 are operated to determine whether the detected buried object contains an explosive material and of what type.

In a preferred embodiment, this second mode excites the bent monopole 101 with electromagnetic energy known to excite nuclear quadrupole resonance (NQR) using using continuous Rabi transitions. In this NQR mode the system can utilize the monopole element pair in conjunction with other elements of the portal type explosive detection system that was described in prior U.S. patent application Ser. No. 13/628,824 filed Sep. 27, 2012 entitled "NQR Detection Using Continuous Rabi Transitions", the entire contents of which are hereby incorporated by reference.

In this mode, the antenn(as) 101 emit a time varying eletromagnetic field which envelopes the object of interest. If the object contains explosives, the coherent emissions are reflected through receiver components and fed to the digital transceiver 106.

It is possible that the same roll bar antenna 101 for in the first mode can be used to provide the excitation loops in the second operating mode. However other embodiments are possible where a different antenna mounted on the vehicle is used for the chemical detection mode; or the second mode detection may occur via antennas, receivers, and/or processors located on an auxiliary remote controlled or robotic vehicle that is deployed after the buried object is detected.

Figure 5:
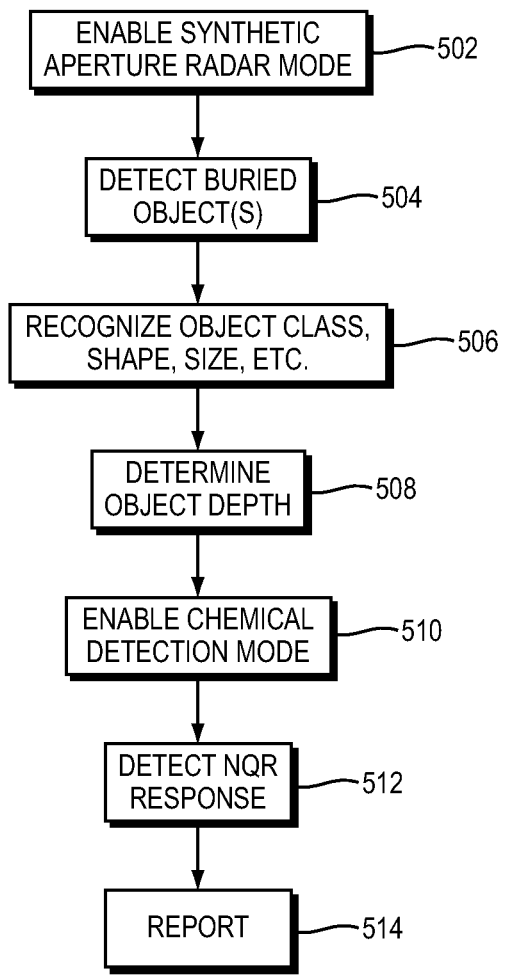
FIG. 5 is a flow diagram of the steps performed by the processor.

FIG. 5 is a flow diagram for the operating states of the processor 106.

State 502. The platform vehicle travels along a road taking data continuously over a wide frequency band using the Electroactive Tuned Focusing Sensor creating a wideband synthetic aperture.

State 504. Near-field subwavelength probing used to detect buried objects or voids.

State 506. Recognizes class of object (shape, size, metallic, non-metallic, etc.).

State 508. Determines depth the object resides.

State 510. Buried object is detected; cue a Fine Detection mode to determine if object is a BEH.

State 512. Higher power, lower frequency emission mode is enabled. State 514. Reports results (e.g., via NQR or other techniques).

Figure 6:
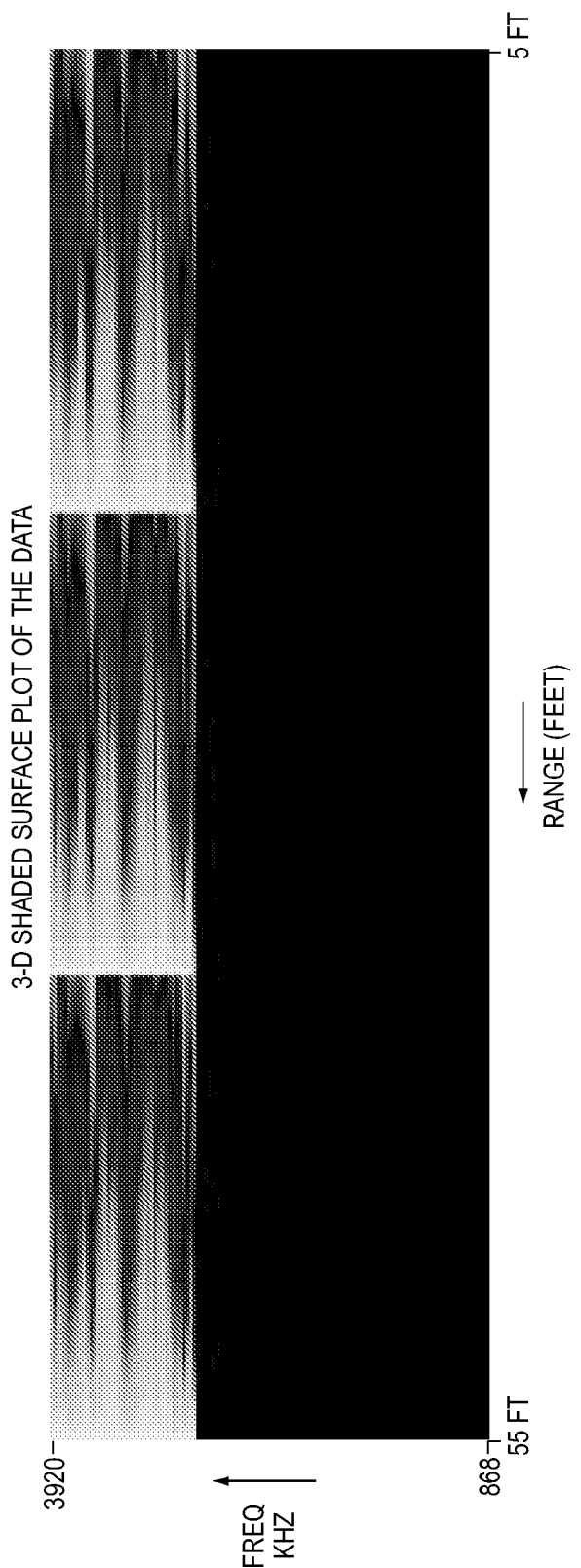
FIG. 6 is a response plot.

Testing was performed using a Humvee (with roll bar antenna) approaching a 600 foot IED command wire are shown in FIG. 6. Data at frequencies from 868 to 3920 KHz were taken at 1 foot intervals from a 55 foot standoff distance. A feature based library of various IED wire lengths was used to synthesize matched filters representing radar range gate functions at 50, 40, 30, and 20 feet.

Figure 7:
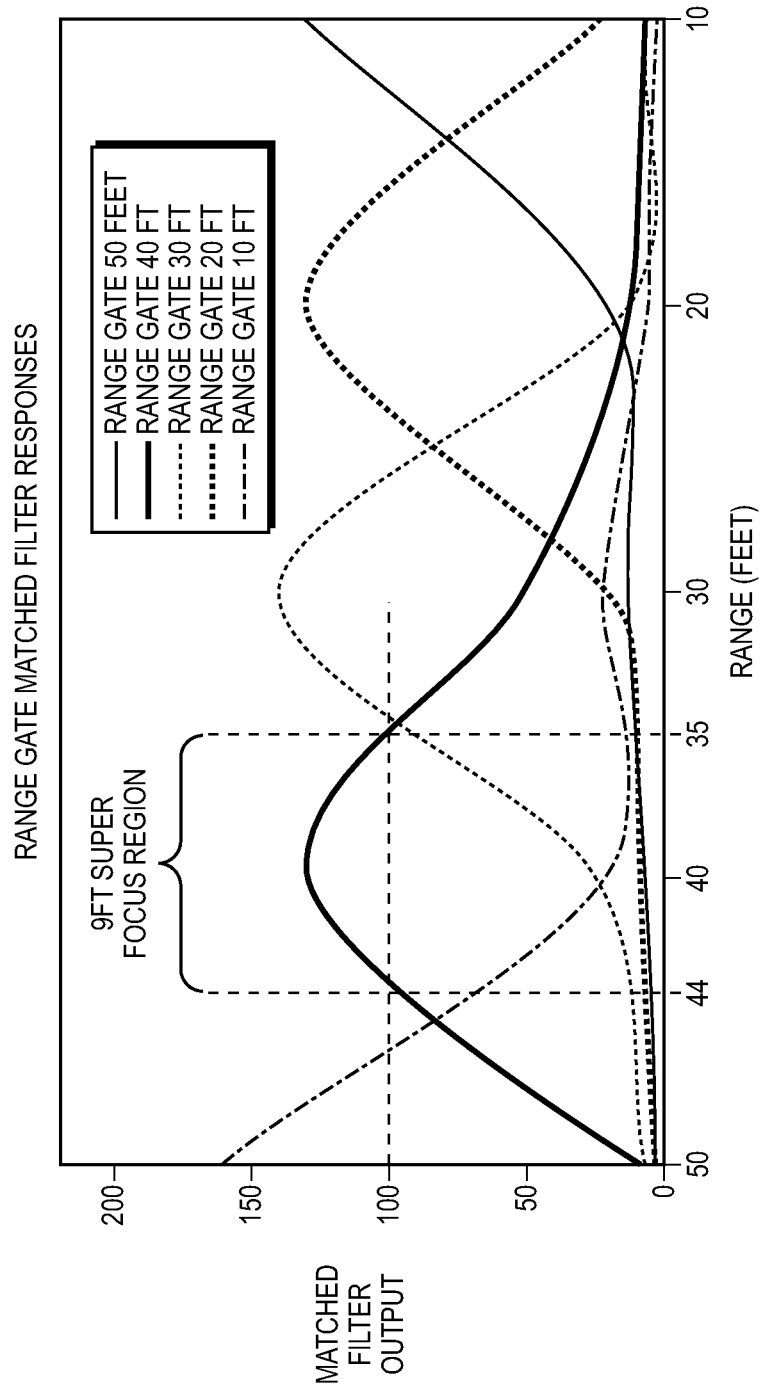
FIG. 7 shows range gate matched filter responses.

As the vehicle approached the IED wire the range gates' output are shown in FIG. 7. The range gate resolution, which is seen to be 5-8 feet at the 3 db points, is well below the diffraction limit for these low frequencies where the average wavelength used was 400 feet. As the objects of interest become smaller and the upper frequency range is extended to UHF, it is anticipated that similar performance can be maintained.

What is claimed is:

1. A method for detecting a buried explosive object comprising:
    disposing one or more radiating element(s) on a moving vehicle;
    driving at least one of the radiating element(s) with first signal type comprising a wideband swept continuous wave signal;
    detecting a response to the first signal type;
    determining a presence of a buried object from the response to the first signal type; and
    subsequent to determining said presence of a buried object, driving the same at least one radiating element with a second signal type; detecting a response to the second signal type; and
    determining a chemical composition of the object from the response to the second signal type.

2. The method of claim 1 further comprising:
    creating a time varying electromagnetic field exciting continuous transitions between two energy states in a nucleus of the buried object as Nuclear Quadrupole Resonance (NQR);
    receiving resulting coherent radio frequency emissions from the object; and
    processing the coherent emissions to determine if the object is an explosive object.

3. The method of claim 1 wherein the step of driving at least one of the radiating elements with the first signal type and detecting a response further comprises:
    operating as a wide band continuous wave (CW) swept radar.

4. The method of claim 2 wherein the step of driving at least one of the radiating elements with the first signal type and detecting a response further comprises:
    operating as a near field, super gain, synthetic aperture CW radar.

5. The method of claim 2 additionally comprising:
    detecting a portion of transmitter power while driving the radiating elements with the second signal type, to provide a reference signal, and
    where the step of processing the coherent emissions further uses the reference signal to determine if the object is an explosive object.

6. The method of claim 1 wherein is the radiating elements further comprise a split element antenna disposed as a roll bar on the vehicle.

7. The method of claim 1 wherein the steps of driving at least one of the radiating elements with a first signal type and detecting a response to the first signal type comprises a monopulse radar.

8. The method of claim 1 wherein the radiating element comprises a synthetic aperture array defined by R(p) being a location of a desired subwavelength focusing spot, R(s) a location of element s in the array, RI(s) a location of image elements, and A(s,n) are weighting coefficients to focus the array.

* * * * *

UNITED STATES PATENT AND TRADEMARK OFFICE
CERTIFICATE OF CORRECTION

PATENT NO. : 8,912,943 B2  
APPLICATION NO. : 13/705343  
DATED : December 16, 2014  
INVENTOR(S) : John T. Apostolos et al.

Page 1 of 1

It is certified that error appears in the above-identified patent and that said Letters Patent is hereby corrected as shown below:

In the specification:

Col. 3, line 29 should read:
antenna 110. It can for example take the shape of a roll bar Signed and Sealed this
Fourteenth Day of April, 2015

Michelle K. Lee
*Director of the United States Patent and Trademark Office*